United States Patent
Daukas et al.

(10) Patent No.: US 6,289,683 B1
(45) Date of Patent: Sep. 18, 2001

(54) MOLD, PROCESS AND SYSTEM FOR PRODUCING ICE SCULPTURES

(75) Inventors: Mark Daukas, Newport Beach, CA (US); Dennis D. Fitzgerald, Cheney, WA (US)

(73) Assignee: Ice Cast Engineering, Inc., Cheney, WA (US)

( * ) Notice: Subject to any disclaimer, the term of this patent is extended or adjusted under 35 U.S.C. 154(b) by 0 days.

(21) Appl. No.: 09/454,414

(22) Filed: Dec. 3, 1999

(51) Int. Cl.[7] ..................................................... F25C 1/18
(52) U.S. Cl. ..................................... 62/68; 62/75; 62/356
(58) Field of Search ................................. 62/68, 75, 347, 62/348, 356

(56) References Cited

U.S. PATENT DOCUMENTS

| | | | |
|---|---|---|---|
| 2,774,224 | * 12/1956 | Bayston | 62/356 |
| 3,803,871 | * 4/1974 | Karas | 62/348 |
| 4,550,575 | * 11/1985 | DeGaynor | 62/356 |
| 5,029,453 | * 7/1991 | Scherer | 62/356 |
| 5,884,490 | * 3/1999 | Whidden | 62/356 |
| 5,970,735 | * 10/1999 | Hobelsberger | 62/356 |

* cited by examiner

Primary Examiner—William E. Tapolcai
(74) Attorney, Agent, or Firm—Wells, St. John, Roberts, Gregory & Matkins, P.S.

(57) ABSTRACT

An ice sculpture mold, forming assembly and process is described in which a mold body is releasably received within an immersion tank having an open top end defined by a peripheral rim, and a closed bottom. The mold includes an internal cavity shaped as a negative of a selected ice sculpture form, and includes a top section positionable adjacent the open top end of the immersion tank and a bottom section positionable adjacent the closed bottom of the immersion tank. The mold body also includes at least one water intake and discharge openings formed in the upper section mold body, openly communicating with the internal cavity. A water circulating pump and water delivery tube are connected to each intake opening. The water discharge and intake openings are positioned on the mold to enable circulation of water within the assembled mold cavity to facilitate freezing of water in the assembled mold cavity to form an ice sculpture that is visually clear and devoid of clouding and air bubbles.

3 Claims, 8 Drawing Sheets

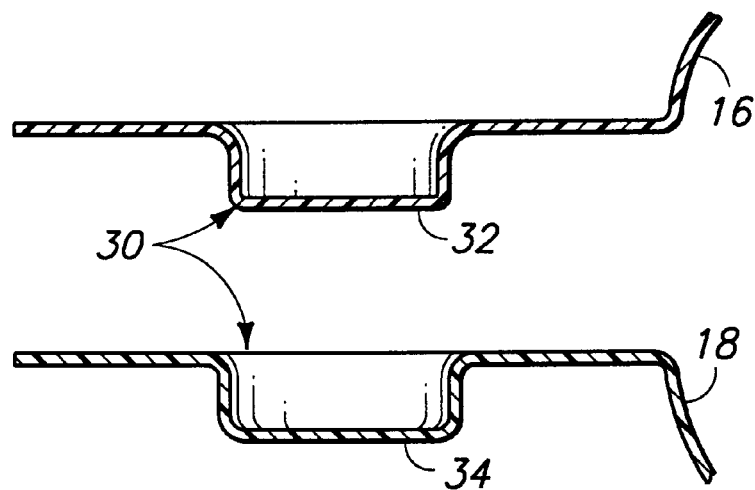
_Fig. 7_
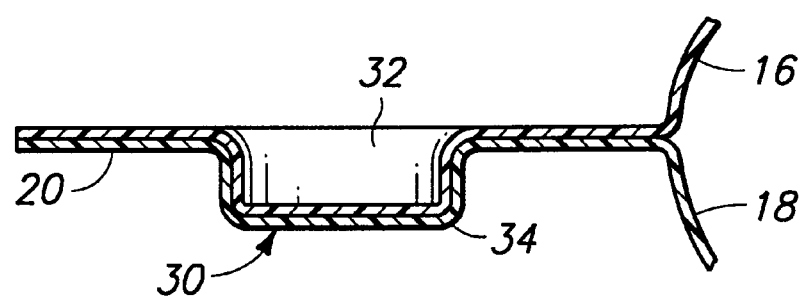
_Fig. 8_

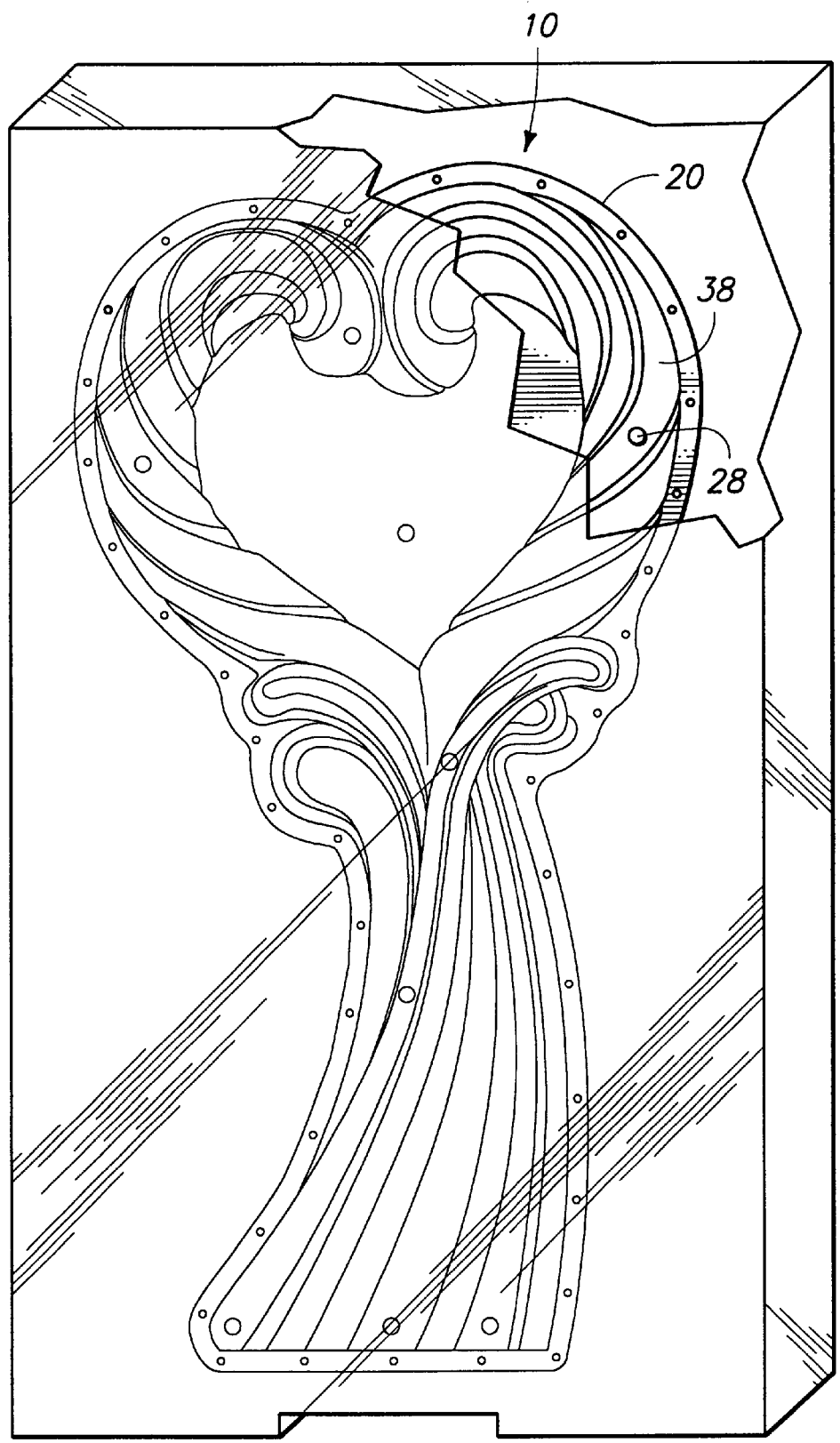

MOLD, PROCESS AND SYSTEM FOR PRODUCING ICE SCULPTURES

TECHNICAL FIELD

The present invention relates to production of ice sculptures using molds.

BACKGROUND OF THE INVENTION

In the past and in present practice, ice sculptures have been made by carving shapes from blocks of ice. This is a very tedious, uncomfortable and time-consuming skilled process. The resulting ice sculptures are often very expensive and therefor appeal to a relatively small market.

In order to provide affordable ice sculptures, molds have been made. These are typically top-open molds that can be filled with water and frozen. After freezing, the mold is removed, leaving a shaped sculpture for use or for minor finishing touches by the ice sculptor.

While the above mold concept is effective for producing ice forms at reasonable cost, the quality of the sculpture is almost always poor. This is most often due to air bubbles that form in the sculpture as the water freezes. The result is that the sculpture has a cloudy appearance that is unappealing and distracts from the sculptural form.

Quality hand carved ice sculpture is made from clear ice blocks. Such blocks can be made by using professional ice block forming machinery that include special provisions for circulating water during the freezing process to remove impurities which cause cloudiness. However, such machinery is quite expensive and cannot affordably be made with tanks shaped like individual sculpture designs. Instead a rectangular block is formed and the sculpture must be carved. Until advent of the present invention there has not been a mold, process or system known to the present inventors that will enable production of quality, visually clear ice sculptures using a mold.

Attempts have been made to produce ice sculptures from molds, but all such attempts known to the present inventors have failed to produce quality visually clear ice sculptures. In one attempt, illustrated in U.S. Pat. No. 2,545,592 to Sherbloom, air is pumped into a water filled mold submerged in a brine or water solution. It was believed that the air would influence water circulation in the mold and that impurities would migrate to the center of the mold. The impurities could then be removed by suction and fresh water could be added. While this process may have functioned to produce a structurally better sculpture due to immersion of the mold, the cloudy ice issue remained. There was no disclosure in Sherbloom of how the impurities could have been removed from the mold, nor is there any indication that air bubbles are eliminated. Quite to the contrary, the pressurized air jets would quite likely contribute to formation of air bubbles in the sculpture.

Other attempts made to provide ice sculpture molds have focused not on the problem of removing cloudiness, but in allowing for expansion of the ice as it forms to thereby avoid cracks. This problem is allegedly solved by providing molds with expansion capability so the mold sections will move or expand as the water inside freezes. While such units might function to avoid cracks, the possibility for entrained air bubbles and impurities to remain in the finished sculpture remains.

A need has thus remained for good quality mold formed ice sculptures that are at least substantially free of impurities and extremely clear in appearance, with no special skills required to produce quality artistic products.

An objective of the present invention is therefor to substantially eliminate all cloudiness in mold formed ice sculptures by circulating water through the mold during ice formation.

The above and further objects and advantages will become evident from the following description which, in combination with the accompanying drawings and claims, sets forth the best mode presently contemplated for carrying out the present invention.

BRIEF DESCRIPTION OF THE DRAWINGS

Preferred embodiments of the invention are described below with reference to the following accompanying drawings.

FIG. 7 is an exploded fragmented enlarged sectional view of fasteners for the mold parts;

FIG. 8 is a view similar to FIG. 7 only showing the mold parts connected; and

FIG. 9 is a fragmented view of the mold embedded within an ice block.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The present invention, preferred examples of which are described herein, is embodied in a mold for ice sculpture, an ice sculpture forming assembly, and a process for producing the ice sculpture.

Figure 1:
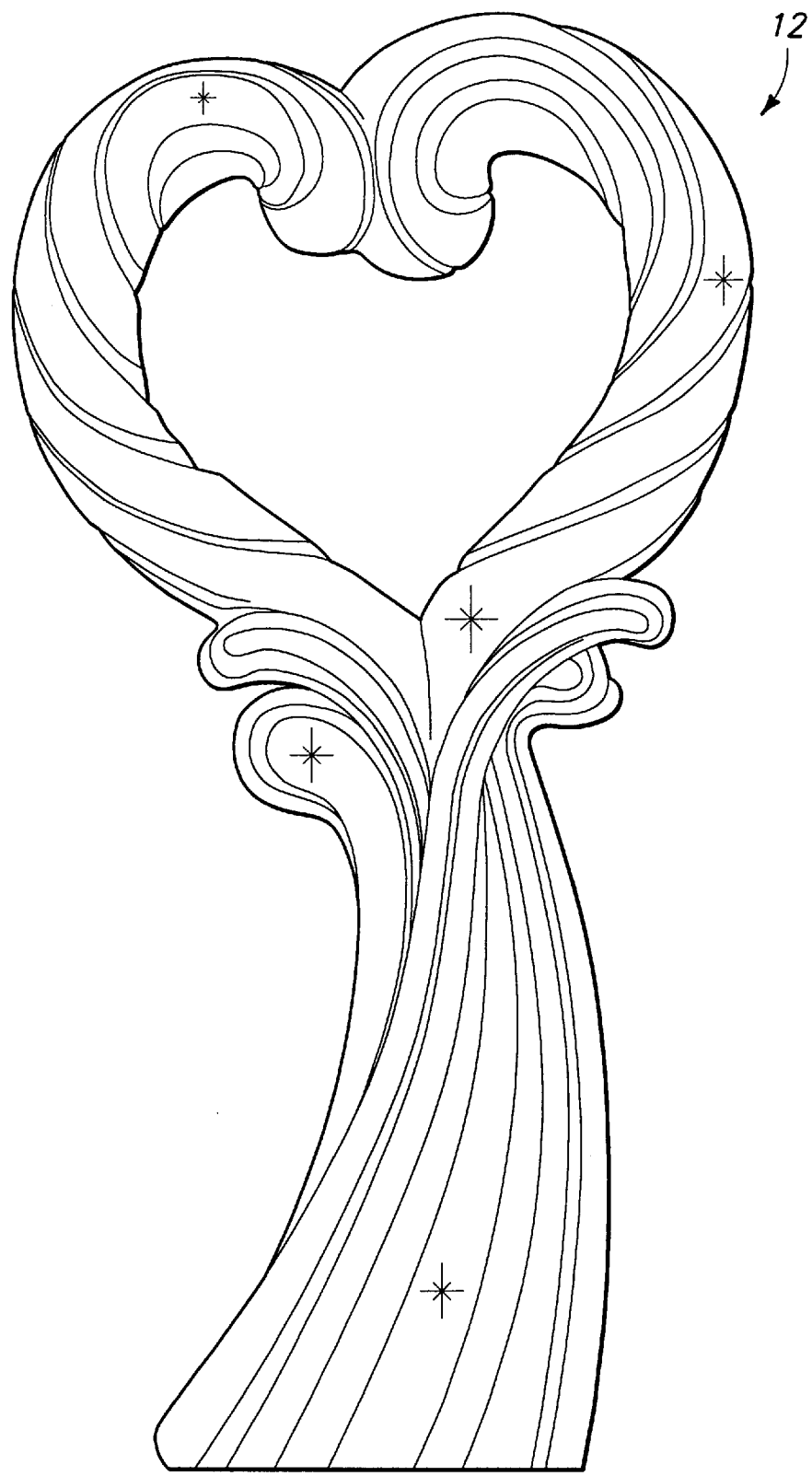
FIG. 1 is a frontal elevation view of an exemplary ice sculpture that may be produced using the present invention.
Figure 2:
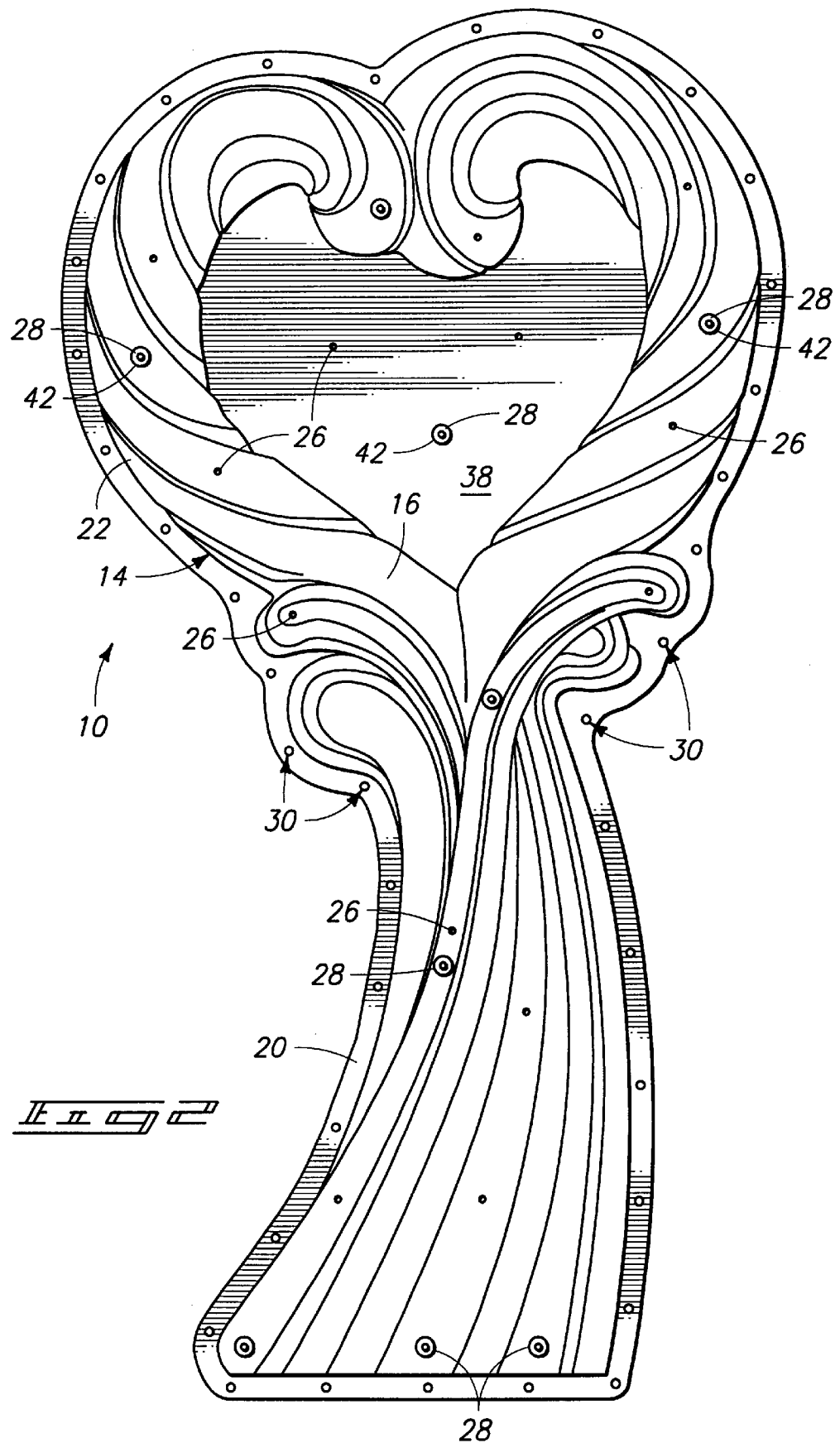
FIG. 2 is a frontal elevation view of a mold for producing the ice sculpture example shown in FIG. 1.
Figure 3:
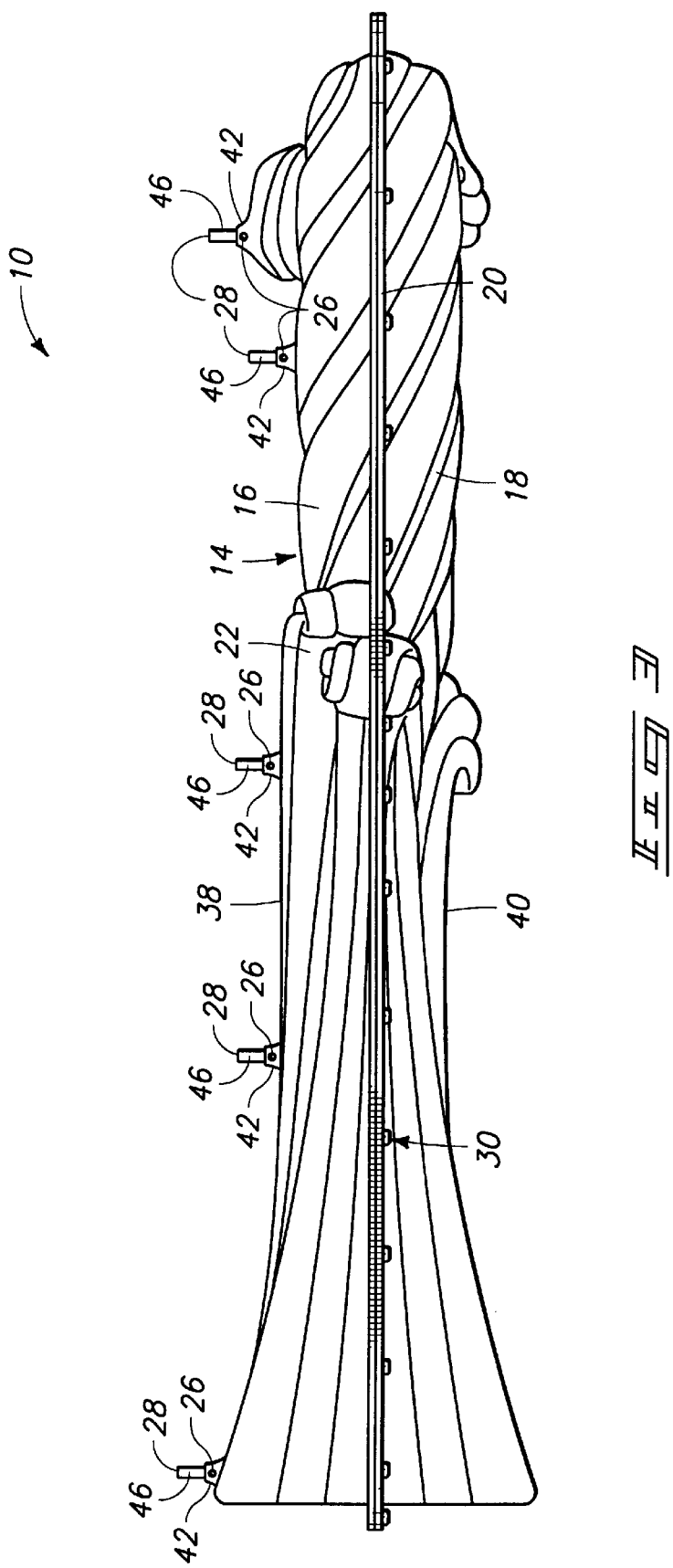
FIG. 3 is a side elevation view of the mold.

In a preferred embodiment, a mold for an ice sculpture is exemplified in the drawings by the reference numeral 10. It is noted that the mold may take many forms and that the resulting ice sculpture 12 (FIG. 1) may take an equal number of forms. However all forms of the present ice sculpture mold will include characteristics common to the present invention.

In a preferred form, a mold body 14 is formed of multiple mold parts 16, 18. While two mold parts are shown, it should be understood that more parts could be used according to the nature of the sculpture to be produced.

It is preferred that the mold body be formed of a flexible plastic material such as polyethylene. More specifically, high density polyethylene (HDPE) in sheet form having a thickness of approximately 0.060 inches has been found to be preferred for thermoforming mold parts.

The above plastic material facilitates mold formation using standard thermoforming techniques. Also, when in use, the plastic material will flex without breaking when being pried loose from the frozen ice sculpture form. Further, the use of flexible plastic materials for the mold parts enables repeated mold use. This is possible since the mold parts are not likely to be destroyed or damaged when they are removed from the frozen ice sculpture form.

Each of the preferred mold parts advantageously includes at least one flange section 20 at a marginal edges of adjacent mold sections 22 that define a portion of the selected ice sculpture form. The flanges 20 are positioned to enable assembly of the mold parts into a configuration whereby the mold sections define an assembled mold cavity 24 (FIG. 6) representing a negative of the selected ice sculpture form 10.

At least one of the multiple mold parts includes at least one water discharge opening 26 configured to enable passage of water outwardly from the assembled mold cavity. In the example illustrated, there are numerous openings 26 placed about the mold parts to facilitate water discharge. Placement of the openings 26 is preferably determined by the configuration of the selected sculpture form as will be better understood following further description of the mold parts.

At least one of the preferred multiple mold parts also includes at least one water intake opening 28 that is formed therein, configured to enable passage of water inwardly into the assembled mold cavity. It may be preferred to use multiple intakes 28 as shown in the exemplary drawings to maximize flow in certain selected areas where circulation is needed for proper ice formation.

In preferred forms of the present mold 10, at least one fastener 30 is provided on at least some of the mold parts to releasably interconnect selected flanges of the mold parts. Exemplary fasteners are shown in detail by FIGS. 7 and 8. The exemplary fasteners are formed integrally by the mold material and are comprised of buttons 32 formed on one mold flange, and releasably mating apertures 34 formed by indentations in the flange of the respective adjoining mold part. The buttons 32 may be snapped into the apertures 34 to releasably secure the mold parts together. When the freezing process is complete, the buttons 32 may simply be un-snapped from the apertures 34 to enable the mold parts to be removed from the frozen ice sculpture form.

It is pointed out that while the fastener configuration described above is preferred, other fastener configurations could be used to releasably connect the mold parts together. Thus the term "fastener" should be understood to broadly include any form of releasable connector that will serve to releasably secure adjacent flanges together. Such fasteners could include but not be limited to clips or clamps of various forms, snaps, nut and bolt assemblies, or other releasable securing devices.

The water discharge openings 26 and the water intake openings 28 are positioned on the mold parts 17 to enable circulation of water within the assembled mold cavity to facilitate freezing of water in the assembled mold cavity to form an ice sculpture 12 that is visually clear. Circulation of water within the mold cavity, while freezing, substantially eliminates impurities during ice formation and leaves the resulting ice sculpture visually clear and without the typical cracking and cloudiness experienced in many other mold-formed ice sculptures.

Figure 4:
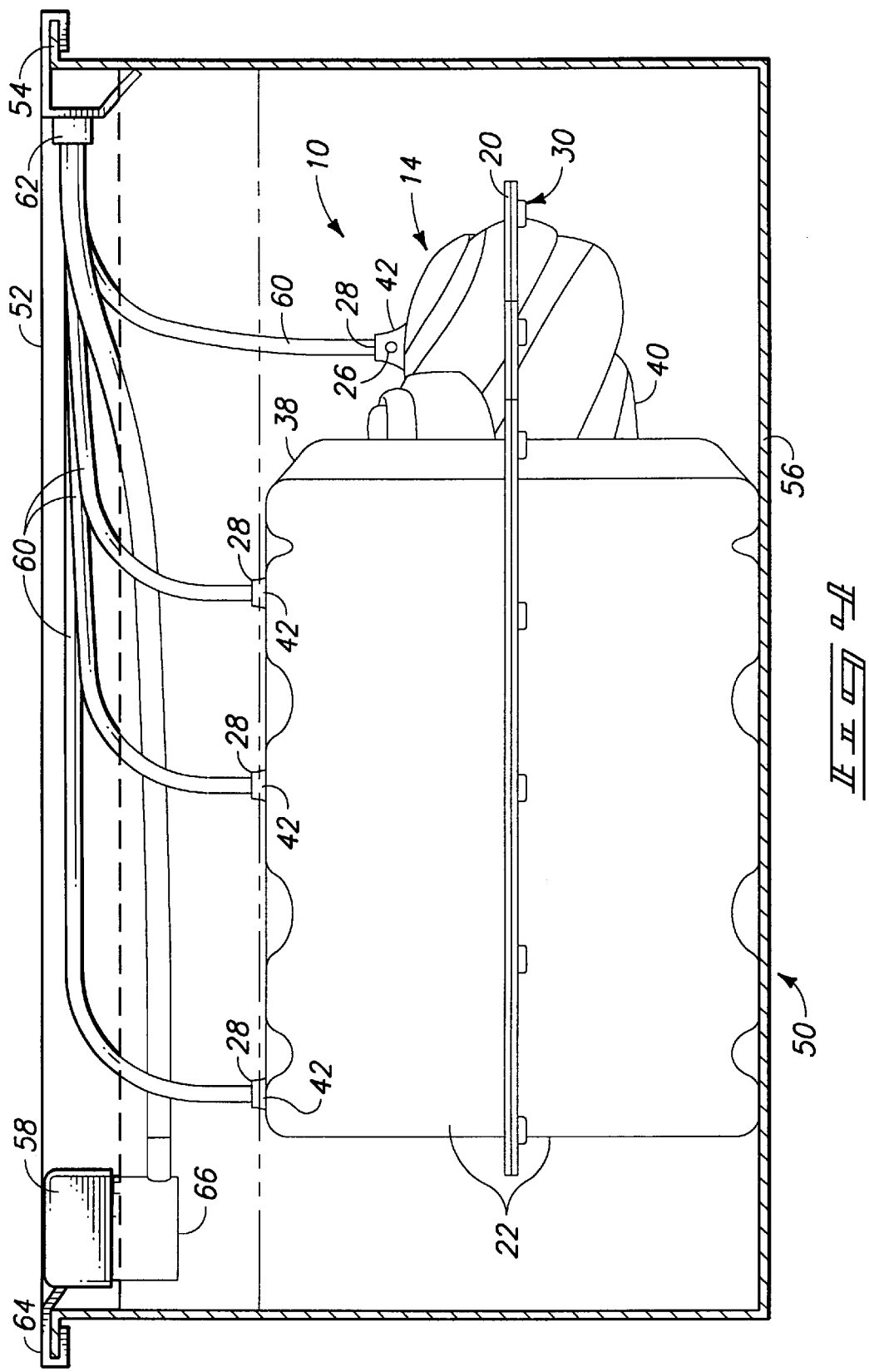
FIG. 4 is a sectional view through a preferred immersion tank with the preferred mold immersed in water and also showing connections to a water pump.

To enhance the above results, it is preferred that the assembled mold body 14 include a top section 38 and a bottom section 40. The top section 38 is preferably that part of the mold body that includes the at least one water discharge opening 26 and the at least one water intake opening 28. The bottom section 40 may be devoid of openings 26 and 28, though this may depend upon the configuration of the mold. Generally speaking, the top section 38 will be situated toward the top perimeter of the immersion tank (described below) and the bottom section will be situated adjacent the bottom wall of the tank as shown by FIG. 4. This is done to insure the intake openings are the last to freeze, at a given location, providing circulation (until frozen) to all areas of the mold, to insure absolute clarity throughout the mold until the freezing process is complete.

With water circulation directed from the top section downwardly, and the ice machines' freezing coil underneath the bottom of the tank, ice will form first in the bottom section of the mold and progressively freeze upwardly into the top section. Freezing from the bottom up is very advantageous since air bubbles will have a chance to float upwardly and escape through the discharge openings 26. If the freezing process were to occur in the normal manner (from all sides inwardly), any entrained air bubbles and all impurities would be captured in the ice along with cracking.

Figure 6:
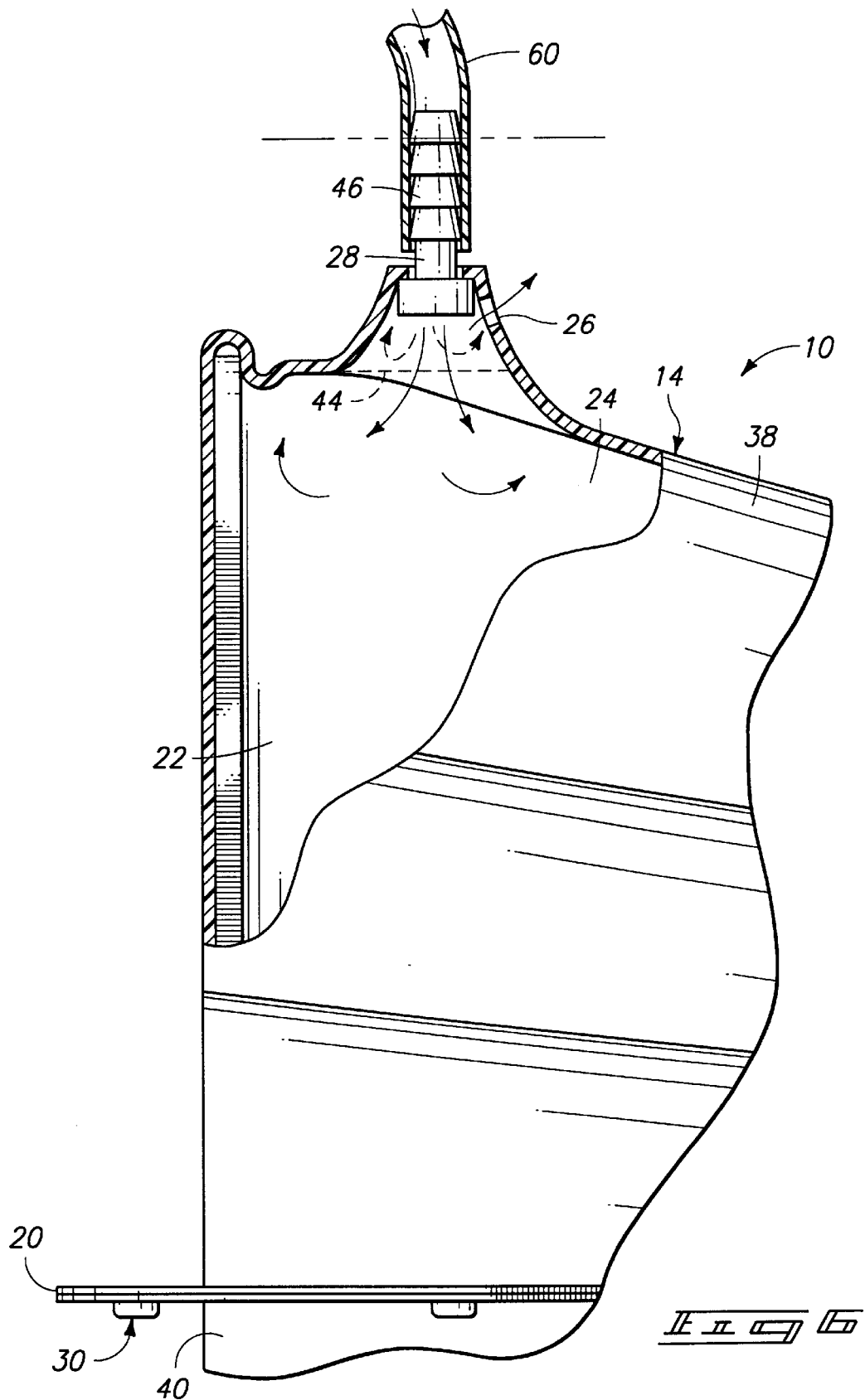
FIG. 6 is an enlarged fragmented view showing connection between a water delivery tube and an intake fitting on the mold.

Another preferred aspect that enables visually clear ice formation in the mold is location of the discharge and intake openings 26, 28 along the mold surface. It is preferred to situate at least some of the water discharge openings 26 adjacent to the intake openings 28 (FIG. 6). Such placement is especially advantageous in areas of the mold body that are elevated. For example, FIG. 6 illustrates a portion of the mold having an elevated part where both intake and discharge openings are located.

Placement of the openings 26, 28 in the most elevated parts of the mold assures proper circulation during ice formation in the various mold parts. As ice formation occurs upwardly from the bottom of the mold, the gradually ascending ice level will progressively reduce the volume of the unfrozen areas within the mold above the ice level. Placement of intake and discharge openings at high points throughout the mold will thus permit continued water circulation in these gradually reducing volumes until such time that all the water in the mold cavity becomes frozen, and no air pockets will be present.

In keeping with the above provision, it is desirable to situate the intake openings 28 at top ends of elevated sprues 42 formed in the mold. The sprues 42 are raised areas that do not necessarily form part of the sculptural shape, but provide a space above the intended shape for water to circulate. An adjacent water discharge opening 26 is also preferably situated along the sprue adjacent the intake 28 to facilitate circulation and formation of ice to a level (as suggested by line 44 in FIG. 4) within the sprue that is above or "proud" of the sculptural form surface. This is done to avoid formation of unclear pockets in the area of the intake and discharges and to avoid formation of bubbles along the inside surface of the mold.

In preferred forms of the present mold, a water intake fitting 46 is mounted to the mold at each intake opening 28. FIG. 6 illustrates an exemplary fitting 46 as including a barb type fitting at an outward end and a headed portion at an inside end. The barbs and headed parts hold the fittings 46 loosely in place on the mold, since it is not necessary for a water-tight seal. The barbed ends are used to releasably receive ends of water delivery tubes that will be described below.

As shown in FIG. 6, a part of the mold may include provisions for mounting a base plate 47 inside the mold cavity. The base plate 47 is used to insure that a flat surface will be formed on the sculpture so the sculpture will stand properly when finished. The base plate 47 may fit in appropriately formed recesses 49 in the mold and can be easily removed from the mold and from the sculpture.

The above description has thus far been directed specifically to the mold 10. Further description will now be given with respect to the present assembly in which the preferred mold 10 is used to produce ice sculptures 12.

Figure 5:
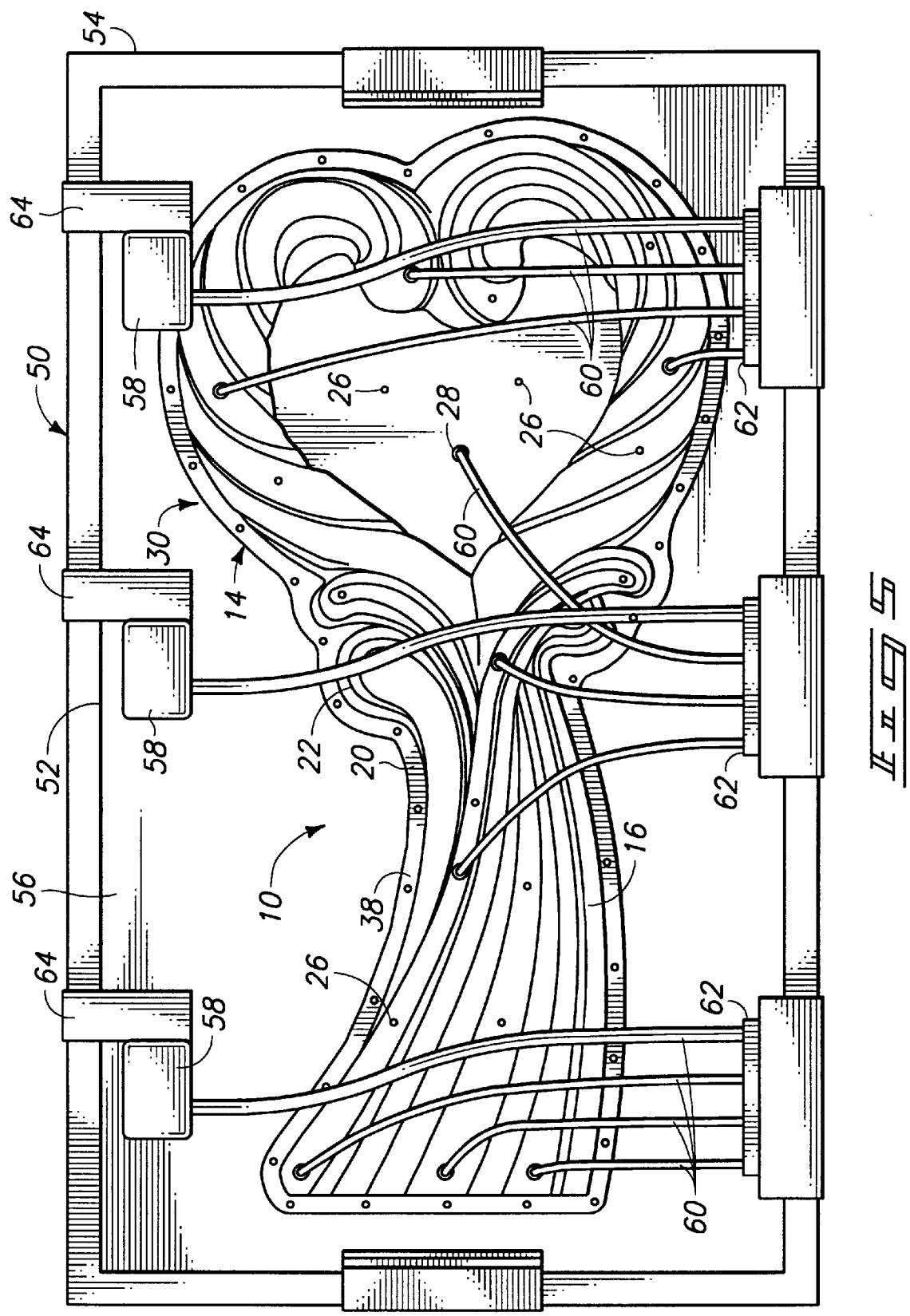
FIG. 5 is a top plan view of the preferred immersion tank with the preferred mold immersed therein and showing connections to multiple water pumps.

A preferred ice sculpture forming assembly is shown in FIGS. 4 and 5 in which an immersion tank 50 is provided, having an open top end 52 defined by a peripheral rim 54. The preferred tank also includes a closed bottom 56.

In practice the tank 50 may be a conventional ice block freezing tank specially designed for production of large ice blocks. Such tanks are readily available in the present market and include features (not shown) such as refrigeration coils at the tank bottom and wall configurations designed for removal of the blocks after they are frozen. An example of a preferred tank is the Model CB300X2 manufactured by Clinebell Equipment Co., Inc., at 850 Denver Avenue, Loveland, Colo. 80537.

Alternatively, the tank may be an appropriate open top water receptacle of sufficient volume to receive the present mold 10 and enough water to enable immersion of the mold with the top mold section 38 facing upwardly, adjacent the open top rim 54, and the bottom mold section 40 adjacent the closed bottom 56. It is preferred that refrigeration elements associated with the tank be arranged so freezing of the water in the tank occurs from the bottom of the tank upwardly.

At least one water circulating pump 58 is provided in the preferred forms, and more may be used depending upon the size of the mold being used. The pump or pumps may be selected from numerous commercially available pumps that provide a continuous flow of water at low pressure and low volume. An appropriate pump is a conventional electrically operated magnetic driven type pump that delivers approximately 170 gallons per hour.

At least one water delivery tube 60 is preferably connected to the water circulating pump and is releasably connected to the at least one of the water intake openings 28 on the mold. Depending upon the complexity and size of the sculpture, it may be more preferable that one such tube 60 lead from each pump 58 to a manifold 62 which provides connection for more delivery tubes that lead to the various water intake openings 28. More than one pump may be used, and more than one manifold may also be used according to the number of water intake openings provided on the mold. FIG. 5 shows by way of example, three pumps delivering water to three manifolds which, in turn deliver water through nine tubes 60 to the same number of water intake openings on the mold.

It is preferable that the pumps be mounted by brackets 64 to the top rim 54 of the tank at an elevation where the pump intakes 66 may be submerged in the water. Water may thus be drawn into the pumps 58 from the tank area outside the mold and delivered through the tubes 60 and intake openings 28 into the mold cavity. This displaces water inside the mold which is allowed to exit through the various discharge openings 26. Water circulation within the mold is therefor established using only the water in the tank.

The present process for forming an ice sculpture may now be understood. The presently preferred process includes the general process components of:

1. Providing a mold body substantially as described above, having an internal cavity shaped as a negative of a selected ice sculpture form and in which the mold body includes at least one water intake and at least one water discharge opening;
2. Circulating water within the mold body by introducing water through the at least one water intake opening and discharging water through the at least one water discharge opening; and
3. Progressively freezing water within the internal cavity to form the selected ice sculpture in a consistency visually clear in appearance.

It is further preferred that the present process include immersing the mold body in water within an immersion tank of the general nature described above. It is preferred that the immersion be such that the water surrounds the mold body and fills the internal cavity. It is also preferable that circulation of the water within the mold body be accomplished by flowing water from outside the body into the mold cavity and discharging displaced water from within the body back into the water in which the body is immersed.

It is also preferred that the process include orienting the at least one water intake opening and the at least one water discharge opening in an orientation above an adjacent portion of the internal cavity. By accomplishing this, air bubbles which have a natural tendency to raise, will collect and be dispersed through the discharge opening, leaving the water inside the body substantially free of air bubbles.

In a preferred operation, the body may first be assembled by interconnecting the various mold parts 16, 18 using the fasteners 30 to secure the successive mold parts together. The assembled body may then be placed in the immersion tank 50 in an orientation with the bottom mold section 40 situated adjacent the tank bottom 56 and the top section 38 position adjacent the open top 52.

Next, the upwardly oriented water intake opening or openings are connected to an equal number of water delivery tubes 60. The remaining tube ends are connected either directly to the pump or pumps, or are connected to one or more manifolds 62. Each pump is mounted to the tank in such a manner that the pump intake 66 is situated below the intended water level in the tank.

The tank is then filled with water. The water will also fill the mold cavity through the various mold openings and non-watertight joints between adjacent flange sections 20. It may be desirable to weight the mold at this point to prevent it from floating as the tank and mold cavity are filled.

Enough water is poured into the tank to a level above the highest water intake opening 28 and to a point where the pump intake 66 is submerged. This is best understood with reference to FIG. 4 where the water fill level is indicated by a dashed line.

The freezing and pumping operation may now begin. It is preferred that the freezing operation be accomplished in a refrigerated atmosphere, with primary refrigeration directed to the tank itself. Most preferably, refrigeration is directed primarily to the bottom of the tank. This may be best accomplished using a tank and refrigeration system provided especially for formation of ice blocks, for example the ice block tank referred to above.

The water recirculating action, in which water is taken from the tank outside the mold and pumped through the one or more water intake openings 28 in the mold, assures that the water will freeze in the tank 50 and mold 10 in an upward progression starting at the tank and mold bottom. This is due to the water currents flowing into and out from the mold top section, and the extremely cold temperature at the bottom of the tank (it being preferred that refrigeration coils are situated at the tank bottom). The freezing process will progress, and the ice surface will gain elevation within the tank and mold until such time that the entire mold is encased in a block of ice. The top of the ice block is indicated by a phantom line in FIG. 4.

Activities during the ice forming process may include successive removal of water flow tubes 60 from the water intake openings 28 that are situated at low elevations in the tank. Referring to FIG. 4, the intake opening 28 at the far right hand side of the mold will be encased in ice before the three openings to the left. Thus the user may elect to remove the tube 60 from the right hand outlet as the ice level reaches the top of the associated sprue 42. This eliminates the need later to chip the tube free of the ice block. Other tubes at progressively higher elevations may be similarly removed as the ice level raises.

During the freezing process, air bubbles and impurities that would otherwise be captured in the ice, are allowed to float and be carried in the water current out through the discharge openings 26. This may be aided by tapping on the mold once in a while. The resulting ice formation within the mold will thus be visually clear and substantially free of impurities and air bubbles.

After the ice covers and fills the entire mold, the block is removed from the tank. FIG. 8 represents the resulting block which encases the mold. The user may later chip the ice away from the mold using conventional tools, primarily an ice pick, to expose the mold surface. The mold parts 16 may then be successively stripped from the block by releasing the fasteners 30 and peeling the mold parts from the surface of the ice sculpture.

Parts of the sculpture may include ice flashing in the area of the flanges 20 and raised nubs where the sprues 42 may have filled with ice. These may be easily removed using conventional ice carving tools, leaving a complete, visually clear finished ice sculpture.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A process for forming an ice sculpture, comprising
   providing a mold body having an internal cavity shaped as a negative of a selected ice sculpture form and in which the mold body includes at least one water intake and at least one water discharge opening;
   immersing the mold body in water;
   circulating water within the mold body by introducing water through the at least one water intake opening and discharging water through the at least one water discharge opening; and
   progressively freezing water within the internal cavity to form the selected ice sculpture of ice in a consistency that is clear in appearance.

2. A process for forming an ice sculpture as defined by claim 1, further comprising:
   orienting the at least one water intake opening and the at least one water discharge opening in an orientation above an adjacent portion of the internal cavity.

3. A process for forming an ice sculpture as defined by claim 1, further comprising:
   orienting the at least one water intake opening and the at least one water discharge opening in an orientation above the internal cavity; and
   wherein the step of immersing the mold body in water is accomplished such that water surrounds the mold body and fills the internal cavity.

* * * * *